United States Patent
Arbeiter et al.

(10) Patent No.: US 10,937,201 B2
(45) Date of Patent: Mar. 2, 2021

(54) METHOD AND DEVICE FOR GENERATING A VEHICLE ENVIRONMENT VIEW FOR A VEHICLE

(71) Applicant: Conti Temic microelectronic GmbH, Nuremberg (DE)

(72) Inventors: Georg Arbeiter, Kueps (DE); Rodrigo Garcia Marques, Bamberg (DE); Martin Simon, Floh-Seligenthal (DE); Johannes Petzold, Kulmbach (DE); Joerg Schrepfer, Tettau (DE); Markus Friebe, Gefrees (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 16/464,006

(22) PCT Filed: Sep. 15, 2017

(86) PCT No.: PCT/DE2017/200096
§ 371 (c)(1),
(2) Date: May 24, 2019

(87) PCT Pub. No.: WO2018/095490
PCT Pub. Date: May 31, 2018

(65) Prior Publication Data
US 2020/0258266 A1    Aug. 13, 2020

(30) Foreign Application Priority Data
Nov. 25, 2016 (DE) ............... 10 2016 223 391.2

(51) Int. Cl.
*G06T 11/00* (2006.01)
*G06T 7/90* (2017.01)
(Continued)

(52) U.S. Cl.
CPC ............ *G06T 11/001* (2013.01); *B60R 11/04* (2013.01); *G06K 9/00791* (2013.01); *G06T 7/40* (2013.01);
(Continued)

(58) Field of Classification Search
CPC combination set(s) only.
See application file for complete search history.

(56) References Cited

U.S. PATENT DOCUMENTS 8,319,618 B2   11/2012   Gomi et al.
9,676,331 B2   5/2017    Hartmann
(Continued)

FOREIGN PATENT DOCUMENTS

DE   102011077398   12/2012
DE   102012211025   1/2014
(Continued)

OTHER PUBLICATIONS

English translation of the International Search Report of the International Searching Authority for International Application PCT/DE2017/200096, dated Dec. 4, 2017, 2 pages, European Patent Office, HV Rijswijk, Netherlands.
(Continued)

*Primary Examiner* — Wesner Sajous
(74) *Attorney, Agent, or Firm* — W. F. Fasse

(57) ABSTRACT

A method for generating a vehicle environment view involves: capturing camera images with vehicle cameras on a vehicle body of a vehicle; and calculating of the vehicle environment view based on the camera images. In the vehicle environment view, a texture of a non-visible region of a ground surface located under the vehicle body and not visible to the vehicle cameras is calculated based on texture data of a visible region of the ground surface that is visible to vehicles cameras and surrounds the non-visible region.

14 Claims, 2 Drawing Sheets

(51) Int. Cl.
*G06T 7/40* (2017.01)
*B60R 11/04* (2006.01)
*G06K 9/00* (2006.01)

(52) U.S. Cl.
CPC .......... *G06T 7/90* (2017.01); *B60R 2300/105* (2013.01); *B60R 2300/303* (2013.01); *G06T 2207/10024* (2013.01); *G06T 2207/30252* (2013.01)

(56) References Cited

U.S. PATENT DOCUMENTS

| | | | |
|---|---|---|---|
| 9,811,743 | B2 | 11/2017 | van Beek |
| 9,892,493 | B2 | 2/2018 | Pekkucuksen et al. |
| 10,163,226 | B2 | 12/2018 | Ermilios |
| 2010/0104199 | A1* | 4/2010 | Zhang .................... G08G 1/165 382/199 |
| 2014/0347470 | A1 | 11/2014 | Zhang et al. |
| 2015/0008294 | A1* | 1/2015 | Desbordes ................ G06T 7/20 246/122 R |
| 2019/0213744 | A1 | 7/2019 | Friebe et al. |
| 2020/0051435 | A1 | 2/2020 | Hashimoto et al. |

FOREIGN PATENT DOCUMENTS

| | | |
|---|---|---|
| DE | 102012112724 | 6/2014 |
| DE | 102016005463 | 11/2016 |
| GB | 2 525 053 | 10/2015 |

OTHER PUBLICATIONS

PCT International Preliminary Report on Patentability including English Translation of PCT Written Opinion of the International Searching Authority for International Application PCT/DE2017/200096, dated May 28, 2019, 6 pages, International Bureau of WIPO, Geneva, Switzerland.

German Search Report for German Patent Application No. 10 2016 223 391.2, dated Jun. 9, 2017, 8 pages, German Patent and Trademark Office, Muenchen, Germany, with partial English translation, 7 pages.

M. Bertalmino et al., "Simultaneous Structure and Texture Image Inpainting", Proceedings of the 2003 IEEE Computer Society Conference on Computer Vision and Pattern Recognition (CVPR'03), IEEE Transactions on Image Processing, vol. 12(8), Aug. 2003, 6 pages (or pp. 882-889).

Antonio Criminisi et al., "Region Filling and Object Removal by Exemplar-Based Image Inpainting", IEEE Transactions on Image Processing, vol. 13(9), Sep. 2004, pp. 1200 to 1212.

Stern (online): "In diesem Video spielt Deutschland ganz allein" ("In this video, Germany plays all alone"), with partial English translation, http://www.stern.de/sport/fussball/wm-2014/news/halbfinale-ohne-brasilien-in-diesem-video-spielt-deutschland-ganz-allein-3954312.html, (video accessible at: https://www.youtube.com/watch?v=ZnesldPR0Y4, accessed on Jul. 6, 2017), 3 pages.

* cited by examiner

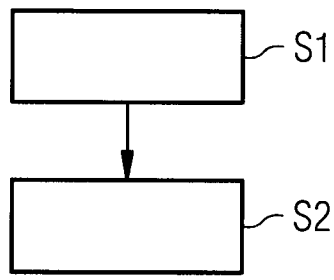
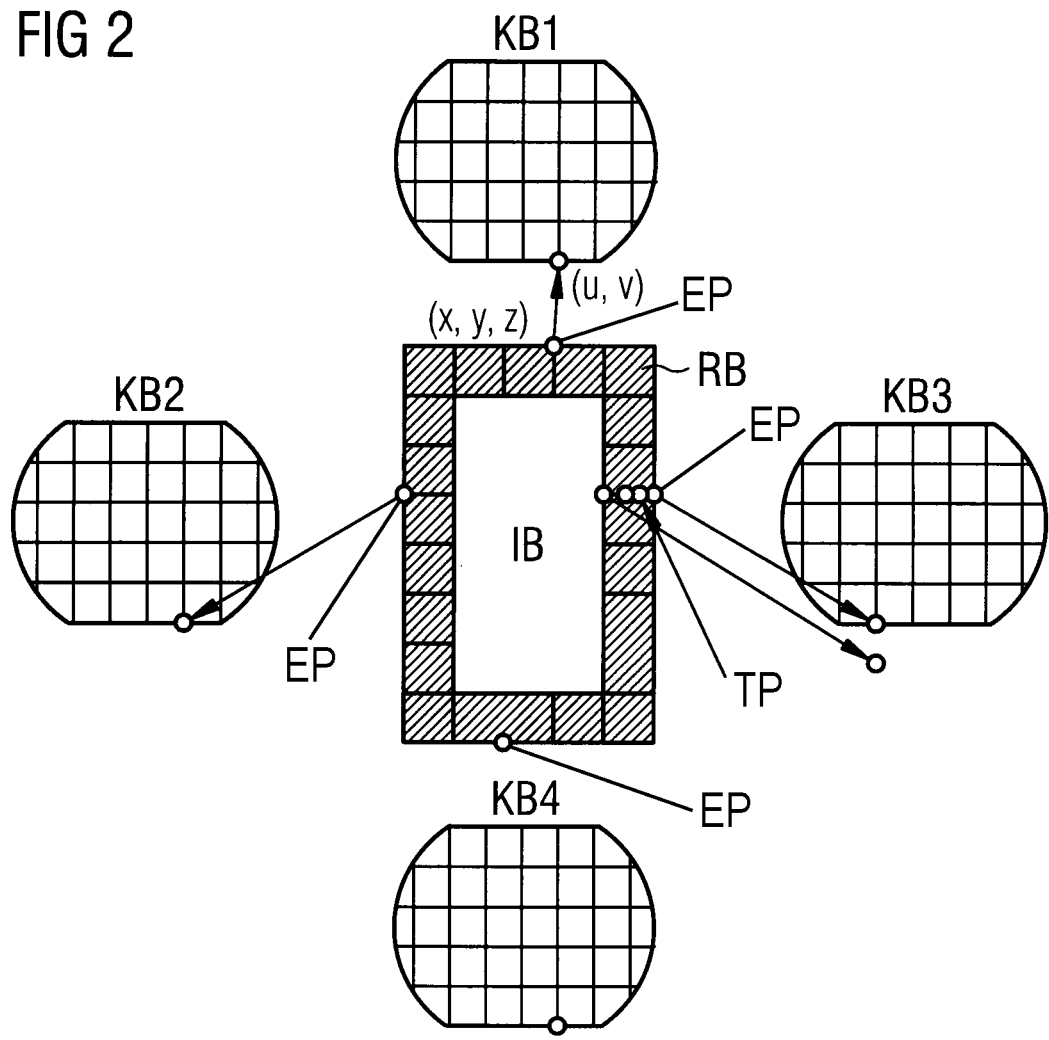

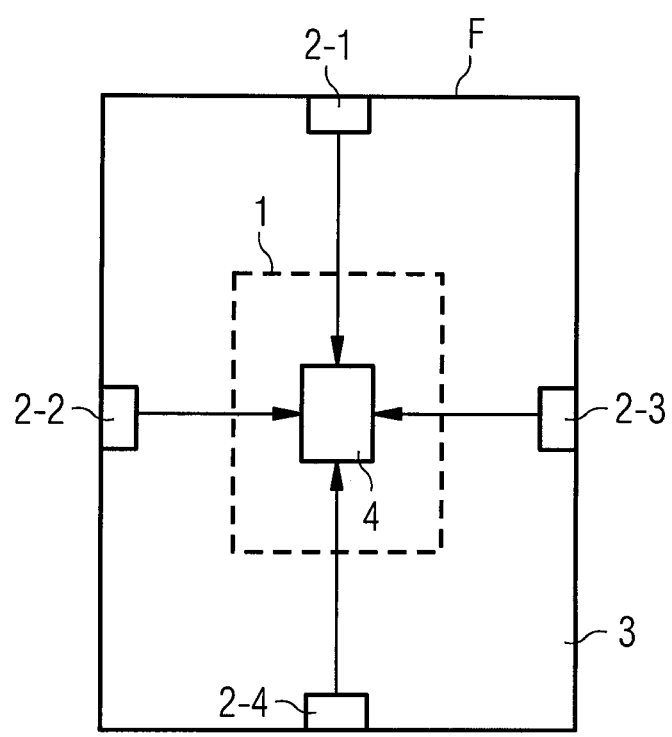

METHOD AND DEVICE FOR GENERATING A VEHICLE ENVIRONMENT VIEW FOR A VEHICLE

FIELD OF THE INVENTION

The invention relates to a method and a device for generating a vehicle environment view, in particular in a road vehicle.

BACKGROUND INFORMATION

Vehicles are increasingly equipped with systems for representing the environment of the vehicle. These so-called surround view systems reproduce the vehicle environment as accurately as possible. Conventional systems for representing the vehicle environment view evaluate camera images which are acquired by vehicle cameras that are attached to the body of a vehicle. The vehicle cameras are conventionally laterally attached to different sides of the vehicle body, in order to generate camera images of the environment of the vehicle and to transfer them to an image data processing unit. However, the vehicle cameras attached to the body of the vehicle do not supply any image data of a ground surface on which the vehicle body is situated. Said ground surface is situated under the vehicle body and is not visible to the vehicle cameras. In the case of conventional surround view systems, the ground surface located under the vehicle body is reproduced in a constant color hue. Therefore, a conventional vehicle environment view constitutes a relatively poor representation of the vehicle environment in the region of the ground surface. The result of this unsatisfactory representation of the vehicle environment in the region of the ground surface located under the vehicle body is that a driver of the vehicle is only supported in a sub-optimum manner during the execution of driving maneuvers, for example parking maneuvers, by the driver assistance system which displays or evaluates the determined vehicle environment view, such that the vehicle body can be damaged, for example, during the performance of a vehicle maneuver.

SUMMARY OF THE INVENTION

It is therefore an object of the present invention to create a method and a device for generating a vehicle environment view, which supply a more realistic vehicle environment view in the region of the ground surface covered by the body of the vehicle and, consequently, support the driver efficiently during the performance of driving maneuvers and, in particular, avoid damage to the vehicle body.

According to a first aspect of the invention, this object can be achieved by a method for generating a vehicle environment view having the features according to the invention as set forth herein.

The invention accordingly creates a method for generating a vehicle environment view, comprising the steps:
providing of camera images by vehicle cameras that are provided on a vehicle body of a vehicle, and
calculating of the vehicle environment view based on the provided camera images,
wherein a texture of a region of a ground surface located under the vehicle body and not visible to the vehicle cameras is calculated within the vehicle environment view subject to texture data of a region of the ground surface that is visible to the vehicle cameras and surrounds the non-visible region of the ground surface.

In one possible embodiment of the method according to the invention, the texture of the region of the ground surface located under the vehicle body and not visible to the vehicle cameras has pixels, the image data values of which are extrapolated based on image data values of the pixels of the region of the ground surface that is visible to the vehicle cameras.

In another possible embodiment of the method according to the invention, the image data values of the pixels have color image data values.

In another possible embodiment of the method according to the invention, the vehicle environment view is generated while the vehicle is moving over the ground surface.

In another possible embodiment of the method according to the invention, the vehicle environment view is generated while the vehicle is stationary on the ground surface.

In another possible embodiment of the method according to the invention, the texture of the region of the ground surface located under the vehicle body and not visible to the vehicle cameras is calculated by a calculation unit in real time based on the camera images provided by the vehicle cameras.

In another possible embodiment of the method according to the invention, the texture of the region of the ground surface located under the vehicle body and not visible to the vehicle cameras has an inner region having a uniform color and an edge region that surrounds the inner region.

In another embodiment of the method according to the invention, a color transition from the colors detected by means of the vehicle cameras at the edge of the non-visible region to the uniform color of the inner region is generated in the edge region.

According to another aspect of the invention, the above object can be achieved by a device for generating a vehicle environment view having the features according to the invention as set forth herein.

The invention accordingly creates a device for generating a vehicle environment view having vehicle cameras that are attached to a vehicle body of a vehicle and supply camera images of the environment of the vehicle, and having a calculation unit that calculates the vehicle environment view based on the provided camera images, wherein a texture of a region of a ground surface located under the vehicle body and not visible to the vehicle cameras is calculated within the vehicle environment view subject to texture data of a region of the ground surface that is visible to the vehicle cameras and surrounds the non-visible region of the ground surface.

In one possible embodiment of the device according to the invention, the texture of the region of the ground surface located under the vehicle body and not visible to the vehicle cameras has pixels, the image data values of which are extrapolated by the calculation unit based on image data values of the pixels of the region of the ground surface that is visible to the vehicle cameras.

In another possible embodiment of the device according to the invention, the image data values of the pixels, which are evaluated by the calculation unit, have color image data values.

In another possible embodiment of the device according to the invention, the vehicle environment view is generated by the device while the vehicle is moving on the ground surface or is stationary on the ground surface.

In another possible embodiment of the device according to the invention, the texture of the region of the ground surface located under the vehicle body and not visible to the vehicle cameras is calculated by the calculation unit in real time based on the camera images provided by the vehicle cameras.

In one possible embodiment of the device according to the invention, the texture of the region of the ground surface located under the vehicle body and not visible to the vehicle cameras has an inner region having a uniform color and an edge region that surrounds the inner region.

In one possible embodiment of the device according to the invention, a color transition from the colors detected by means of the vehicle cameras at the edge of the non-visible region to the uniform color of the inner region is generated in the edge region.

According to another aspect, the invention creates a driver assistance system having a device for generating a vehicle environment view according to the second aspect of the invention.

According to another aspect, the invention further creates a vehicle having such a driver assistance system.

In one possible embodiment, the vehicle comprises a land vehicle, a watercraft or an aircraft.

BRIEF DESCRIPTION OF THE DRAWINGS

Possible embodiments of the method according to the invention for generating a vehicle environment view and the device according to the invention for generating a vehicle environment view are described in detail below, with reference to the appended figures, wherein:

FIG. 1 shows a flow chart for representing one embodiment example of a method according to the invention for generating a vehicle environment view;

FIG. 2 shows a schematic view for representing the mode of operation of the method represented in FIG. 1 for generating a vehicle environment view;

FIG. 3 shows a block diagram for representing one embodiment example of a device according to the invention for generating a vehicle environment view.

DETAILED DESCRIPTION OF EXAMPLE EMBODIMENTS OF THE INVENTION

As can be seen from FIG. 1, a method for generating a vehicle environment view according to the first aspect of the invention has, in the case of the represented embodiment example, two steps.

In a first step S1, camera images KB are provided by vehicle cameras that are provided on a vehicle body of a vehicle F. The different vehicle cameras continually supply camera images or image data by means of signal lines for data processing. The vehicle cameras are, in this case, preferably provided on different sides of the vehicle body of the vehicle F. The vehicle F can preferably be a land vehicle, in particular a road vehicle or an agricultural vehicle. Furthermore, the vehicle F can also be a watercraft or an airplane or aircraft. For example, an aircraft can capture camera images of the vehicle environment following landing while moving in the airport.

In another step S2, a vehicle environment view FUA of the vehicle F is calculated based on the camera images KB provided by the camera. In this case, a texture of a region of a ground surface located under the vehicle body or vehicle hull and not visible to the vehicle cameras is calculated within the vehicle environment view subject to texture data of a region of the ground surface that is visible to the vehicle cameras and surrounds the non-visible region of the ground surface. In this case, the calculation of the vehicle environment view FUA is preferably effected by a calculation unit in real time based on the image data or camera images transferred by the vehicle cameras. In one possible embodiment, the texture of the region of the ground surface located under the vehicle body or vehicle hull and not visible to the vehicle cameras has pixels, the image data values of which are extrapolated based on image data values of the pixels of the region of the ground surface that is visible to the vehicle cameras. The image data values of the pixels have, in one possible embodiment, color image data values. In one possible embodiment, the vehicle environment view FUA of the environment of the vehicle F is generated while the vehicle F is stationary on a ground surface. Furthermore, in one possible embodiment, the vehicle environment view FUA can also be generated while the vehicle is moving across the ground surface. The texture of the region of the ground surface located under the vehicle body and not visible to the vehicle cameras is calculated by the calculation unit in real time based on the camera images provided by the vehicle cameras.

FIG. 2 schematically shows the generation of a vehicle environment view FUA in order to perform the method according to the invention. FIG. 2 schematically shows the view from above of a body of a vehicle F, for example of a car or truck. The vehicle F can, in this case, be stationary on a ground surface or can be moving across a ground surface. The vehicle body of the road vehicle is substantially rectangular. Vehicle cameras, which supply camera images KB of the vehicle environment to a calculation unit, are situated on the vehicle body on different sides. The vehicle cameras can, for example, be fish-eye cameras which transfer appropriate image data to the calculation unit. Different camera images KB1-KB4, which are generated by different fish-eye cameras, are schematically represented in FIG. 2. FIG. 2 shows a first camera image KB1 which is generated by a fish-eye camera situated on the front of the vehicle body. Furthermore, camera images KB2, KB3, which are generated by fish-eye cameras situated on the two longitudinal sides of the vehicle body, are schematically represented. Furthermore, a fourth camera image KB4 is represented in FIG. 2, which camera image is generated by a fish-eye camera which is arranged on the back of the body of the vehicle F. The different camera images KB of the vehicle environment can overlap in one possible embodiment. The different vehicle cameras, in particular fish-eye cameras, cannot supply any image data of the region or ground surface located under the vehicle body. In the case of the method according to the invention, as also represented in FIG. 1, a texture of a non-visible region of a ground surface that is located under the vehicle body and is not visible to the vehicle cameras, in particular fish-eye cameras, is calculated within the vehicle environment view FUA based on texture data of an adjacent visible region of the ground surface that is visible to the vehicle cameras and is located outwardly adjacent to the non-visible region of the ground surface. This adjacent visible region of the ground surface visible to the vehicle cameras is schematically represented in FIG. 2. The different camera images KB which are supplied by the vehicle cameras each contain a plurality of pixels. The texture of the region located under the body of the vehicle F and not visible to the vehicle cameras comprises pixels, the image data values of which are extrapolated by the calculation unit based on image data values of the region of the ground surface that is visible to the vehicle cameras. In this case, the image data values preferably comprise color image data values. In one possible embodiment, the texture of the non-visible region of the ground surface that is not visible to the vehicle cameras comprises two color regions, namely an inner region IB and an edge region RB that surrounds an outer periphery of the inner region IB.

The texture of the inner region IB has a uniform color or a uniform color value. The edge region RB that surrounds the inner region IB, which edge region is represented shaded in FIG. 2, has a continual color transition from the colors detected by means of the vehicle cameras at the edge of the non-visible region to the uniform color of the inner region IB. On the basis of a color value of the edge pixels EP detected by means of the vehicle cameras, which edge pixels EP are situated directly at the edge of the non-visible region that is not visible to the vehicle cameras, a color transition into the uniform color of the inner region IB is consequently generated by transition pixels TP in the edge region RB.

The texture of the region located under the vehicle body and not visible to the vehicle cameras merges, without a significant or respectively hard transition, with the texture of the region of the ground surface that is visible to the vehicle cameras. The reproduction of the vehicle environment in the calculated vehicle environment view FUA is consequently more realistic, such that the driver can be supported more efficiently during the performance of vehicle maneuvers. Furthermore, the generated vehicle environment view FUA can be further processed at further functional units of a driver assistance system, in order to provide further auxiliary or driver assistance functions to the driver. Due to the higher quality of the generated vehicle environment view FUA, the further calculated driver assistance functions can support the driver more reliably. In particular, thanks to the method according to the invention and the device according to the invention for generating a vehicle environment view FUA, so-called blind spots are, above all, avoided at the corners of the vehicle body, which blind spots can in particular result in damage to the vehicle body during parking maneuvers.

FIG. 3 shows a block diagram of one embodiment example of a device 1 according to the invention for generating a vehicle environment view FUA. The device 1 contains a calculation unit 4, in particular a microprocessor or respectively a processor, which evaluates camera images or respectively image data which are transferred by different vehicle cameras 2-*i*. The different vehicle cameras 2-*i* are situated on different sides of a vehicle body 3 of a vehicle F. The vehicle cameras 2-*i* can be fish-eye cameras which supply camera images KB of the environment of the vehicle F in real time. The viewing angles of the different vehicle cameras can overlap in one possible embodiment. The calculation unit 4 performs the image data processing of the received camera images KB in real time in one possible embodiment. The calculation unit 4 of the device 1 performs a calculation of the vehicle environment view FUA based on the received camera images KB, wherein a texture of a region of a ground surface located under the vehicle body 3 of the vehicle F and not visible to the vehicle cameras 2-*i* is calculated within the vehicle environment view FUA subject to texture data of a region of the ground surface that is visible to the vehicle cameras 2 that surrounds the non-visible region of the ground surface. In one possible embodiment, the calculation is effected subject to texture data of an edge region of the ground surface that is visible to the vehicle cameras 2 and surrounds the non-visible region of the ground surface. The vehicle F can be moving or stationary on a ground surface during the performance of the calculation of the vehicle environment view by the calculation unit 4. The vehicle F can be a land vehicle, for example a road vehicle, or an agricultural vehicle. In one possible embodiment, the device 1 for calculating the vehicle environment view FUA forms part of a driver assistance system FAS which offers the driver different assistance functions or respectively auxiliary functions, in particular during the performance of driving maneuvers. In one possible embodiment, the calculated or generated vehicle environment view FUA is intermediately stored in a data memory which is accessed by further functional units of the driver assistance system FAS. In the case of this embodiment, the intermediately stored or respectively plotted vehicle environment view FUA of the vehicle environment is further evaluated by data processing units of the different functional units of the driver assistance system, in order to provide different assistance functions for the driver of the vehicle F. For example, the driver is supported during the performance of a driving maneuver, in particular a parking maneuver, by the driver assistance system FAS. Due to the high quality of the calculated vehicle environment view which also includes a texture of the ground surface, the provided functions can support the driver during the performance of the driving maneuver with greater care and more reliably than is the case with conventional driver assistance systems FAS. The probability of damage to the vehicle body 3 during such a driving maneuver is accordingly reduced. The vehicle F represented in FIG. 3 is, in one possible embodiment, a land vehicle, in particular a road vehicle or an agricultural vehicle. In another possible embodiment, the vehicle F is an aircraft, for example an airplane, the vehicle body or respectively vehicle hull of which is equipped with vehicle cameras 2-*i*. In the case of this embodiment, a pilot of the airplane is supported, for example, during taxiing maneuvers on an airfield. Furthermore, the vehicle F can also be a watercraft or respectively ship, on the hull of which vehicle cameras 2-*i* are situated and supply appropriate camera images KB to a calculation unit 4 in order to generate a vehicle environment view FUA of the ship. The vehicle environment view FUA generated by the calculation unit 4 can, in one possible embodiment, be output by means of a display unit to a driver of a road vehicle or to a pilot of an airplane or a skipper of a watercraft. In one possible embodiment of the environment according to the invention, the vehicle environment view FUA is plotted in a data memory for further evaluation. In another possible embodiment, the calculated vehicle environment view FUA is transferred by means of a transceiver connected to the calculation unit 4 to a central control system. This control system is situated, for example, in the tower of an airport. In this way, third parties can track or respectively monitor the performance of vehicle maneuvers.

REFERENCE NUMERALS

1 Device
2 Vehicle cameras
3 Vehicle body
4 Calculation unit
F Vehicle
KB Camera image
IB Inner region
RB Edge region

The invention claimed is:
1. A method of generating a vehicle environment view, comprising the steps:
 a) with cameras mounted on a vehicle body of a vehicle, capturing camera images of a vehicle environment including a ground surface outside the vehicle; and
 b) processing the camera images and generating a vehicle environment view based on the camera images, wherein the vehicle environment view includes a visible region of the ground surface and a non-visible region of the ground surface;

wherein: the non-visible region is located under the vehicle body, is not visible to the cameras, and is not represented in the camera images;

the visible region is visible to the cameras, is represented in the camera images, and is outwardly adjacent to the non-visible region in the vehicle environment view;

the non-visible region includes an inner region and an edge region that surrounds an outer periphery of the inner region;

an outer edge of the edge region is an outer edge of the non-visible region;

the generating of the vehicle environment view comprises producing synthesized texture data for the non-visible region in the vehicle environment view based on captured texture data of the visible region represented in the camera images;

the synthesized texture data comprises synthesized color data and the captured texture data comprises captured color data;

the producing of the synthesized color data for the inner region of the non-visible region comprises producing uniform color data so that the inner region of the non-visible region has a uniform color in the vehicle environment view; and the producing of the synthesized color data for the edge region of the non-visible region comprises producing transitionally varying color data that transitions from the captured color data in a portion of the visible region adjoining the outer edge of the edge region, to the uniform color data of the inner region, so that the edge region of the non-visible region in the vehicle environment view has a color transition from colors of the visible region in the camera images adjoining the outer edge of the non-visible region, to the uniform color of the inner region of the non-visible region.

2. The method according to claim 1, wherein the synthesized texture data for the non-visible region in the vehicle environment view comprises pixels respectively having synthesized pixel values, the captured texture data of the visible region represented in the camera images comprises pixels respectively having captured pixel values, and the producing of the synthesized texture data comprises extrapolating the synthesized pixel values from the captured pixel values.

3. The method according to claim 2, wherein the synthesized pixel values and the captured pixel values respectively comprise color values.

4. The method according to claim 1, wherein the capturing and the processing of the camera images, and the generating of the vehicle environment view are performed while the vehicle is stationary on the ground surface.

5. The method according to claim 1, wherein the capturing and the processing of the camera images, and the generating of the vehicle environment view are performed while the vehicle is moving over the ground surface.

6. The method according to claim 1, further comprising displaying the vehicle environment view via a display unit to a driver of the vehicle.

7. The method according to claim 1, further comprising providing the vehicle environment view as an input to a driver assistance system of the vehicle, and controlling a driver assistance function of the driver assistance system, wherein the controlling is carried out dependent on the vehicle environment view.

8. A device for generating a vehicle environment view, comprising:

cameras that are mounted on a vehicle body of a vehicle, and that are adapted to capture camera images of a vehicle environment including a ground surface outside the vehicle; and a processor that is connected to the cameras and is configured to receive the camera images from the cameras;

wherein: the processor is configured to process the camera images and to generate a vehicle environment view based on the camera images, wherein the vehicle environment includes a visible region of the ground surface and a non-visible region of the ground surface;

the non-visible region is located under the vehicle body, is not visible to the cameras, and is not represented in the camera images;

the visible region is visible to the cameras, is represented in the camera images, and is outwardly adjacent to the non-visible region in the vehicle environment view;

the non-visible region includes an inner region and an edge region that surrounds an outer periphery of the inner region;

an outer edge of the edge region is an outer edge of the non-visible region;

the processor is configured to generate the vehicle environment view by producing synthesized texture data for the non-visible region in the vehicle environment view based on captured texture data of the visible region represented in the camera images;

the synthesized texture data comprises synthesized color data and the captured texture data comprises captured color data;

the processor is configured to produce the synthesized color data for the inner region of the non-visible region by producing uniform color data so that the inner region has a uniform color in the vehicle environment view; and the processor is configured to produce the synthesized color data for the edge region of the non-visible region by producing transitionally varying color data that transitions from the captured color data in a portion of the visible region adjoining the outer edge of the edge region, to the uniform color data of the inner region, so that the edge region of the non-visible region in the vehicle environment view has a color transition from colors of the visible region in the camera images adjoining the outer edge of the non-visible region, to the uniform color of the inner region of the non-visible region.

9. The device according to claim 8, wherein the synthesized texture data for the non-visible region in the vehicle environment view comprises pixels respectively having synthesized pixel values, the captured texture data of the visible region represented in the camera images comprises pixels respectively having captured pixel values, and the producing of the synthesized texture data comprises extrapolating the synthesized pixel values from the captured pixel values.

10. The device according to claim 9, wherein the synthesized pixel values and the captured pixel values respectively comprise color values.

11. A driver assistance system for a vehicle, comprising the device according to claim 8.

12. A vehicle comprising the driver assistance system according to claim 11 and the vehicle body.

13. The vehicle according to claim 12, being a watercraft or an aircraft.

14. The vehicle according to claim 12, being a road vehicle.

* * * * *

UNITED STATES PATENT AND TRADEMARK OFFICE
CERTIFICATE OF CORRECTION

Page 1 of 1

PATENT NO. : 10,937,201 B2
APPLICATION NO. : 16/464006
DATED : March 2, 2021
INVENTOR(S) : Georg Arbeiter et al.

It is certified that error appears in the above-identified patent and that said Letters Patent is hereby corrected as shown below:

On the Title Page

Item (56) US PATENT DOCUMENTS,
Line 2, after "9,676,331 B2" replace "5/2017" with --6/2017--;

Item (57) ABSTRACT,
Line 3, after "calculating" delete "of";
Line 9, before "cameras" replace "to vehicles" with --the vehicle--;

In the Claims

Column 8,
Line 10, (10th line in Claim 8), after "wherein:" insert a paragraph break;
Line 13, (13th line in Claim 8), after "ronment" insert --view--.

Signed and Sealed this
Third Day of August, 2021

Drew Hirshfeld
*Performing the Functions and Duties of the
Under Secretary of Commerce for Intellectual Property and
Director of the United States Patent and Trademark Office*